United States Patent Office 3,502,723
Patented Mar. 24, 1970

3,502,723
ARYL ALIPHATIC SECONDARY AMINES
Eugene J. Miller, Jr., Wheaton, and Harlan E. Tiefenthal, Western Springs, Ill., assignors, by mesne assignments, to Armour Industrial Chemical Company, a corporation of Delaware
No Drawing. Continuation-in-part of application Ser. No. 500,203, Oct. 21, 1965. This application Oct. 11, 1966, Ser. No. 585,751
Int. Cl. C07c 87/28, 91/30
U.S. Cl. 260—570.8      12 Claims

ABSTRACT OF THE DISCLOSURE

Aryl-substituted aliphatic secondary amine compounds having substituted on a nitrogen atom two long chain alkyl groups having an aryl group attached to an internal carbon atom thereof, useful in the preparation of quaternary ammonium compounds and as surface active agents.

---

CROSS REFERENCE TO RELATED APPLICATIONS

This application is a continuation-in-part of copending application Ser. No. 500,203, filed Oct. 21, 1965 and now U.S. Patent No. 3,444,200.

This invention relates to a novel class of aryl-substituted aliphatic secondary amines, and more particularly this invention relates to secondary amines containing two long chain aliphatic groups to at least one and preferably to two of which an aryl group is attached as a side chain, thereby providing 1 or 2 aralkyl groups. The aliphatic groups are of the long chain or fatty type, and may be the same or different although certain preferred embodiments can be classified as symmetrical secondary amines.

The compounds of this invention have utility for preparing quaternary ammonium compounds of the type described in said copending application, Ser. No. 500,203. Such quaternaries can be used as cationic emulsifiers for preparing asphalt or other bituminous emulsion, but are particularly useful for fabric treatment and in textile processing.

The amine compounds of the present invention can be represented by the following structural formula:

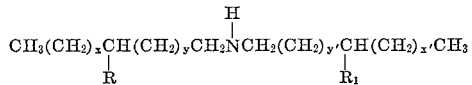

wherein $x$, $x'$, $y$, and $y'$ are integers from 0 to 19 and the totals of $x$ and $y$ or $x'$ and $y'$ are each an integer from 8 to 19, and R and $R_1$ are aryl groups selected from phenyl, naphthyl, and phenyl substituted with from 1 to 2 groups selected from methyl, hydroxy, and methoxy. In a preferred subclass of compounds $x$, $x'$, $y$ and $y'$ are integers from 0 to 15, and the total of $x$ and $y$ or $x'$ and $y'$ is 15. In a related embodiment $R_1$ may be hydrogen while R is aryl as previously defined.

It will be noted from the foregoing formula that the amine compounds contain at least one and preferably two long chain aryl-substituted aliphatic or aralkyl groups. In one specific embodiment, the alkyl portions of the aralkyl groups contain a total of 18 carbons. In other specific embodiments, the alkyl portion of the aralkyl groups contain 11, 16 or 22 carbons. More generally, the total of $x$ and $y$ or $x'$ and $y'$ ranges from 8 to 19. This "total" is three less than the total of carbons in each alkyl portion of the aralkyl groups.

In the formula, R always represents the aryl substituents while $R_1$ may be aryl or hydrogen. In the preferred embodiments R and $R_1$ are both aryl and may represent the same or different aryl groups. The carbon to which the aryl group is attached varies with the respective values of $x$ and $y$ or $x'$ and $y'$. Even where R and $R_1$ are the same aryl groups, the groups may be attached to different position carbons. With unsaturated alkylene chains, such as oleyl, under most reaction conditions the double bond migrates up and down the chain (isomerization by hydrogen ion transfer) resulting in a mixture of isomeric products. In arylating oleyl, there is a tendency for the $C_8$–$C_{14}$ and the $C_{17}$ aryl isomers to predominate, but smaller mole percentages of other isomers, such as the $C_6$, $C_7$, $C_{15}$ and $C_{16}$ isomers are also produced. The mole percent of the $C_2$–$C_5$ isomers is usually quite small or even negligible. The relative proportions of the various isomers may vary depending on the arylation process. See J. Org. Chem. 30, 885–888 (1965). However, the total of $x$ and $y$ will remain constant for the particular substituted chain, viz. 15 for stearyl or octadecyl, 8 for undecyl, 19 for behenyl, etc. By arylation, oleic acid is converted to aryl-substituted stearic acid. Similarly palmitoleic acid, erucic, and 10-undecenoic acids can be converted to the corresponding aryl-substituted carboxylic acids. Ordinary commercial grade oleic acid contains several percent of palmitoleic acid, and therefore a mixture of aryl-substituted stearic and palmitic acids is obtained by arylation.

Among the preferred aryl substituents are phenyl, hydroxyphenyl, tolyl, anisyl, and naphthyl. More generally, the phenyl nucleus may be substituted with 1 or 2 groups such as methyl, hydroxy, and methoxy. Other groups coming within this subclass are cresyl, resorcyl, xylyl, etc.

The secondary amine compounds may be in the form of acid salts, such as hydrochloric, sulfuric, nitric, perchloric, formic, and acetic acid salts. The salt forms may be more water soluble or dispersible, and therefore better adapted for aqueous systems.

As previously indicated, the aryl fatty acids, such as arylstearic acid or arylpalmitic acid, may be prepared by the arylation of the corresponding unsaturated fatty acid (e.g., oleic acid or palmitoleic acid). A catalyst is ordinarily required for such arylation, as is well known in the art. For example, aluminum chloride may be employed as the catalyst. With this process, the fatty acid is preferably first converted to the cyano or nitrile derivative, which is then reacted with the arylating agent in the presence of aluminum chloride. The aryl cyanoaliphatic compound, by procedures well known in the art, can then be converted to the corresponding secondary amine (by hydrogenation).

For direct arylation of fatty acids, other catalysts are preferred, such as activated clays, or hydrofluoric acid. A process employing HF as the catalyst is described in Patent 2,275,312, while the use of an activated clay is described in Patent 3,074,983. An improved HF process is described and claimed in copending application, Ser. No. 451,021, filed Apr. 26, 1965, and now abandoned, entitled "Process for Arylating Unsaturated Fatty Compounds." The arylated fatty acid can then be used to prepare the secondary amine compounds of the present invention. For example, phenylstearic acid (or other aryl-substituted long chain fatty acid) can be converted to the corresponding nitrile, and the nitrile converted to the secondary amine.

This invention is further illustrated by the following specific examples.

EXAMPLE I

Phenylstearic acid and hydroxyphenylstearic acid were prepared from commerical grade oleic acid which contained a few precent of palmitoleic acid by a Friedel-Crafts reaction using acid activated clay as the catalyst, and benzene and phenol, respectively, as the arylating agents. Therefore, phenylstearonitrile was prepared on a continuous nitrile unit over bauxite catalyst at 280–300° C. from 1127 g. phenylstearic acid. A crude yield of 833.5 g. of phenyloctadecylnitrile was obtained, comprising a mixture of isomers, predominately the $C_8$ to $C_{14}$ and the $C_{17}$ isomers, with lesser proportions of other isomers. Similarly, hydroxyphenyloctadecylnitrile was obtained in 62% crude yield from the crude acid. Tolyloctadecylnitrile was obtained in 87% crude yield from distilled tolylstearic acid prepared by an HF catalyst arylation procedure.

EXAMPLE II

Phenylstearonitrile was prepared on a continuous nitrile unit over bauxite catalyst at 340–360° from 691.5 g. of crude phenylstearic acid. A crude yield of 512.0 g. (78.3% yield) was obtained. Similarly, tolylstearonitrile was prepared in 90% crude yield from crude tolylstearic acid, and xylylstearonitrile was prepared in 80% crude yield from crude xylylstearic acid. tolyl-"Tallow" nitrile was prepared in a similar manner from tolyl-"Tallow" acid in 92% yield. The tolyl-"Tallow" nitrile also contains $C_{16}$ and $C_{18}$ unsubstituted nitriles as derived from the conversion of mixed tallow fatty acids.

EXAMPLE III

A one-liter Magne-dash autoclave was charged with 552.3 gms. (1.62 moles) phenyloctadecylnitrile and 19.6 gms. (3% by wt.) copper chromite catalyst. The reactor was flushed with hydrogen and the temperature raised to 195° C. Hydrogen pressure was maintained at 200 p.s.i.g. with continuous bleeding at 195–200° C. After 28 hours of reaction, the mixture was cooled and filtered to yield 525.1 gms. (96.2% mass yield) of viscous amber oil, analyzed as follows.

Analysis:
 Neutralization equivalent—710 (calc'd 674)
 Primary amine—Nil
 Di-(phenyloctadecyl) amine—93.7%
 Tertiary amine—2.7%

The corresponding di-(hydroxyphenyloctadecyl) amine can be prepared by a similar procedure.

EXAMPLE IV

A two-liter Parr autoclave was charged with 478.2 g. (1.345 moles) of tolyloctadecylnitrile and 14.4 g. (3% by wt.) of alcohol washed Raney nickel. The reactor was flushed with hydrogen several times and the temperature was raised to 190° C. Hydrogen pressure was maintained at 150 p.s.i.g. at 190–195° C. with a continuous vent for 13.5 hours. The reaction mixture was then cooled and filtered to yield 466.3 g. (98.9% mass yield) of straw colored oil, analyzing as follows:

Analysis:
 Neutralization equivalent—723 (calc'd 702)
 Primary amine—0.5%
 Di-(tolyloctadecyl) amine—90.0%
 Tertiary amine—8.75%

The corresponding product containing the di-(tolyloctadecyl) amine in a mixture with other unsubstituted secondary amines, such as dioctadecyl and dihexadecyl amines, can be prepared by a similar procedure from tolyl-"Tallow" nitrile. When using a starting material such as tolyl-"Tallow" nitrile, containing mixed nitriles prepared from tallow fatty acids, including, for example, tolyloctadecyl nitrile (42%), tolylhexadecyl nitrile (2%), octadecyl nitrile (20%) and hexadecyl nitrile (29%), several products will be produced. These include: di-(tolyloctadecyl) amine, tolyloctadecyl octadecyl amine, tolyloctadecyl tolylhexadecyl amine, tolyloctadecyl hexadecyl amine, di-(tolylhexadecyl) amine, tolylhexadecyl octadecyl amine, and tolylhexadecyl hexadecyl amine.

EXAMPLE V

A 300 ml. stirred autoclave was charged with 150 g. (0.612 mole) of phenylundecyl nitrile and 3 g. (2% by wt.) of alcohol washed Raney nickel. The reactor was flushed with hydrogen, then heated to 195° C. Hydrogen pressure was maintained at 200 p.s.i.g. at 195–200° C. with a continuous vent for 12.5 hours. The reaction mixture was cooled and filtered to yield 140 g. (95% mass yield) of almost water-white oil, analyzing as follows:

Analysis:
 Neutralization equivalent—482 (calc'd 481)
 Primary amine—3.74%
 Di-(phenylundecyl) amine—90.2%
 Tertiary amine—2.75%

EXAMPLE VI

A one-liter Parr autoclave was charged with 739.2 g. (2.1 moles) of xylyloctadecylnitrile and 18.5 g. (2.5% by wt.) of alcohol washed Raney nickel. The reactor was flushed with hydrogen, then heated to 135° C. Hydrogen pressure was maintained at 200 p.s.i.g./135–140° C. for four hours. The reaction mixture was cooled and filtered to yield a yellow oil having the following analysis:

Analysis:
 Neutralization equivalent—407
 Primary amine—76.8%
 Secondary amine—20.85%

The primary and secondary amines were separated by distillation in vacuo to yield:

Di-(xylyloctadecyl) amine:
 Boiling point—325–360° C./0.2–0.65 mm.
 Neutralization equivalent—701 (calc'd 695)
 Primary amine—4.8%
 Secondary amine—90.0%

Xylyloctadecylamine:
 Boiling point—190–216° C./—.15 mm.
 Neutralization equivalent—370 (calc'd 356)
 Primary amine—95.3%
 Secondary amine—1.4%

EXAMPLE VII

A 300 ml. stirred autoclave was charged with 150 g. (0.375 mole) of phenyldocosylnitrile and 3 g. (2% by wt.) of alcohol washed Raney nickel. The reactor was flushed with hydrogen, then heated to 195° C. Hydrogen pressure was maintained at 200 p.s.i.g. at 195–200° C. with a continuous vent for fifteen hours. The reaction mixture was cooled and filtered to yield 129 g. (87% mass yield) of a clear oil which partially solidified on cooling, analyzing as follows:

Analysis:
 Neutralization equivalent—795 (calc'd 790)
 Primary amine—4.75%
 Di(phenyldocosyl) amine—89.5%
 Tertiary amine—6.45%

We claim:
1. Aryl-substituted secondary amines represented by the formula

wherein $x$, $x'$, $y$ and $y'$ are integers from 0 to 19 and the totals of $x$ plus $y$ and $x'$ plus $y'$ are each an integer from 8 to 19, and R is an aryl group selected from phenyl, naphthyl, and phenyl substituted with from 1 to 2 groups selected from methyl, hydroxy, and methoxy, and $R_1$ is selected from an aryl group as defined for R and hydrogen.

2. The compounds of claim 1 wherein both R and $R_1$ are aryl.

3. The compounds of claim 1 where R and $R_1$ are phenyl.

4. The compounds of claim 1 where R and $R_1$ are hydroxyphenyl.

5. The compounds of claim 1 where R and $R_1$ are tolyl.

6. The compounds of claim 1 where R and $R_1$ are xylyl.

7. A mixture of aryl-substituted isomers of secondary amine compounds represented by the formula

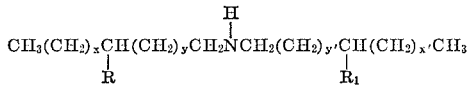

wherein $x$, $x'$, $y$ and $y'$ are integers from 0 to 15 and the totals of $x$ plus $y$ and $x'$ plus $y'$ are each 15, R is an aryl group selected from phenyl, naphthyl, and phenyl substituted with from 1 to 2 groups selected from methyl, hydroxy, and methoxy, and $R_1$ is selected from an aryl group as defined for R and hydrogen.

8. The compounds of claim 7 wherein both R and $R_1$ are aryl.

9. The compounds of claim 7 wherein R and $R_1$ are phenyl.

10. The compounds of claim 7 wherein R and $R_1$ are hydroxyphenyl.

11. The compounds of claim 7 wherein R and $R_1$ are tolyl.

12. The compounds of claim 7 wherein R and $R_1$ are xylyl.

References Cited

UNITED STATES PATENTS

| 2,758,086 | 8/1956 | Stuart et al. | 252—32.5 |
| 3,397,152 | 8/1968 | Brown et al. | 260—570.8 X |

OTHER REFERENCES

Wagner et al.: "Synthetic Organic Chemistry," pp. 658–59 (1953).

ROBERT V. HINES, Primary Examiner

U.S. Cl. X.R.

260—413, 465.1, 465.2, 465, 567.6, 583, 501.1; 252—8.8, 311.5, 357